(12) United States Patent
Yuan et al.

(10) Patent No.: US 9,738,538 B2
(45) Date of Patent: Aug. 22, 2017

(54) METHOD FOR PREPARING NAY MOLECULAR SIEVE OF HIGH SILICA-ALUMINA RATIO AND PRODUCT THEREOF

(71) Applicant: DALIAN INSTITUTE OF CHEMICAL PHYSICS, CHINESE ACADEMY OF SCIENCES, Dalian (CN)

(72) Inventors: Danhua Yuan, Dalian (CN); Xinglong Dong, Dalian (CN); Yunpeng Xu, Dalian (CN); Zhongmin Liu, Dalian (CN); Kunyuan Wang, Dalian (CN); Wei Huang, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 0 days.

(21) Appl. No.: 15/102,193

(22) PCT Filed: Dec. 9, 2013

(86) PCT No.: PCT/CN2013/008875
§ 371 (c)(1),
(2) Date: Jun. 6, 2016

(87) PCT Pub. No.: WO2015/085462
PCT Pub. Date: Jun. 18, 2015

(65) Prior Publication Data
US 2016/0304354 A1    Oct. 20, 2016

(51) Int. Cl.
*C01B 39/24* (2006.01)
*B01J 29/08* (2006.01)
*C01B 39/20* (2006.01)

(52) U.S. Cl.
CPC .......... *C01B 39/24* (2013.01); *B01J 29/084* (2013.01); *C01B 39/205* (2013.01)

(58) Field of Classification Search
CPC ....... C01B 39/205; C01B 39/24; B01J 29/084
See application file for complete search history.

(56) References Cited

U.S. PATENT DOCUMENTS

| 4,333,859 A | 6/1982 | Vaughan et al. |
| 4,483,835 A * | 11/1984 | Zones ............... C01B 33/2876 423/326 |

(Continued)

FOREIGN PATENT DOCUMENTS

| CN | 1736867 A | 2/2006 |
| GB | 2132597 A | 7/1984 |

OTHER PUBLICATIONS

F.Delprato (Zeolites, 10 (1990) 546-552.

(Continued)

*Primary Examiner* — David M Brunsman
(74) *Attorney, Agent, or Firm* — Enshan Hong; VLP Law Group LLP

(57) ABSTRACT

A method for preparing a NaY molecular sieve having a high silica-to-alumina ratio, wherein deionized water, a silicon source, an aluminum source, an alkali source, and ILs as a template agent are mixed to obtain an initial gel mixture; the initial gel mixture is maintained at a proper temperature and aged, then fed into a high pressure synthesis kettle for crystallization; the solid product is separated and dried, to obtain the NaY molecular sieve having a high silica-to-alumina ratio, wherein the ILs is a short-chain alkylimidazolium ionic liquid, the template agent is less volatile, and the resultant high-silicon Y molecular sieve has a high crystallinity and a silica-to-alumina ratio of 6 or more.

7 Claims, 2 Drawing Sheets

(56) References Cited

U.S. PATENT DOCUMENTS

| | | | | |
|---|---|---|---|---|
| 4,714,601 | A | * | 12/1987 | Vaughan ............... C01B 39/205 423/707 |
| 4,931,267 | A | * | 6/1990 | Vaughan ............... C01B 39/205 423/705 |
| 5,273,945 | A | * | 12/1993 | des Courieres .......... B01J 29/70 502/61 |
| 2016/0304354 | A1 | * | 10/2016 | Yuan ....................... C01B 39/24 |

OTHER PUBLICATIONS

Zeolites, 13 (1993) 122-127; U.S. Pat. No. 5,273,945; Zeolites, 15 (1995) 90-96.
F. Delprato (Zeolites, 13 (1993) 122-127.
B.De Witte (Microporous and Mesoporous Materials, 23 (1998) 11-22.
Ma, Yingchong et al., Ionothermal Synthesis of Sodalite Microsphers, Chinese Journal of Inorganic Chemistry, No. 11, vol. 26, Nov. 30, 2010 (Nov. 30, 2010), pp. 1923-1926 (English abstract is provided).
Ma, Yingchong et al., Synthesis of Sodalite in Room-temperature Ionic Liquid, Chemical Journal of Chinese Universities, No. 4, vol. 27, Apr. 30, 2006 (Apr. 30, 2006), pp. 739-741 (English abstract is provided).
Office Action issued by Japanese Patent Office on May 30, 2017 for related Japanese Patent Application No. 2016-557169.

* cited by examiner

METHOD FOR PREPARING NAY MOLECULAR SIEVE OF HIGH SILICA-ALUMINA RATIO AND PRODUCT THEREOF

RELATED APPLICATIONS

This is a U.S. national stage of international application No. PCT/CN2013/088875 filed on Dec. 9, 2013.

TECHNICAL FIELD

The present disclosure pertains to high-silicon NaY molecular sieve synthesis field, and particularly to the synthesis of a NaY molecular sieve having a high crystallinity and a high silica-to-alumina ratio by using a short-chain alkylimidazolium ionic liquid as a template agent.

BACKGROUND ART

A molecular sieve is a hydrated porous crystalline aluminosilicate, which has a highly regular porous cage structure. NaY molecular sieve is a type of molecular sieve having a FAU topological structure, and is a molecular sieve having an ultra-cage structure formed by arranging β cages according to diamond structure. FAU type zeolite comprises X type and Y type, which are different from each other in the aluminum content, that is, silica-to-alumina ratios ($SiO_2/Al_2O_3$) are different. Generally, an X type zeolite has a silica-to-alumina ratio of approximately 2.2-3.0, while a Y type zeolite has a silica-to-alumina ratio of 3-5.

The Y type zeolite is one of main species used as catalysts and adsorption and separation agents, and is applied in the process of petroleum catalytic cracking industry, an emerging oil refining technique which has been developed since 1960s. As a main active component of a catalytic cracking catalyst, the silica-to-alumina ratio of Y molecular sieve plays a dominating role in the catalytic cracking performance, the distribution of products, and the stability of catalyst. The Y molecular sieve having a high silica-to-alumina ratio has the advantages such as high catalytic activity and good stability, and greatly improves the aspect of the entire catalytic cracking industry. At present, the USY type zeolite used industrially is a Y zeolite having a relatively high silica-to-alumina ratio obtained by subjecting raw powder of Y zeolite to treatments such as chemical dealuminzation and physical dealuminzation. However, this post-processing dealuminzation method is energy intensive and complicated in practical application.

Generally, a NaY molecular sieve is prepared by a method using a directing agent under a hydrothermal condition. Specifically, a Y type molecular sieve seed crystal is first prepared under a high-alkalinity environment; this seed crystal is then added to a mixed gel system for NaY synthesis. The Y molecular sieve obtained by this method typically has a silica-to-alumina ratio of about 5.5. The direct method for hydrothermally synthesizing high-silicon Y type zeolite ($SiO_2/Al_2O_3>6$) can avoid complicated procedure of post-processing, save a large amount of human resource and material resource, and reduce the pollution to the environment. At the meanwhile, there is a better catalytic effect due to a complete crystal structure and a uniform chemical distribution. Therefore, it has a great significance to explore a direct method for synthesizing high-silicon Y type zeolite.

In 1982, U.S. Pat. No. 4,333,859 disclosed a FAU polymorph designated as CSZ-3 having a silica-to-alumina ratio of greater than 6, which was obtained under a condition of using $Cs^+$ having a larger ion radius together with seed crystals. The product had the following composition: 0.8-0.95$Na_2O$:0.02-0.20$Cs_2O$:$Al_2O_3$:5.0-7.0$SiO_2$:2-10$H_2O$.

In 1987, U.S. Pat. No. 4,714,601 disclosed a FAU polymorph designated as ECR-4 having a silica-to-alumina ratio of greater than 6, which was prepared by hydrothermal crystallization at 70-120° C. using bis(2-hydroxyethyl)dimethyl ammonium ions or other alkyl quaternary ammonium salts having larger sizes as a template agent. For the initial gel mixture of this material, the molar ratio of silica to alumina was 4-20, and the molar ratio of water to alumina was 100-400.

In 1990, F. Delprato (Zeolites, 10 (1990) 546-552) directly hydrothermally synthesized a Y type zeolite having a silica-to-alumina ratio of 6-10 by using crown ether for the first time, demonstrating the possibility for directly hydrothermally synthesizing a high-silicon Y type zeolite in the presence of an organic template agent. Subsequently, it was reported in a few articles and patents in this respect (Zeolites, 13 (1993) 122-127; U.S. Pat. No. 5,273,945; Zeolites, 15 (1995) 90-96). Although the crown ether has an excellent performance as a template agent, it is not suitable for practical production due to high price and high toxicity.

In 1990, U.S. Pat. No. 4,931,267 disclosed a FAU polymorph designated as ECR-32 having a silica-to-alumina ratio of greater than 6, which was obtained by using tetrapropyl- and/or tetrabutyl ammonium hydroxide as a template agent. For the reaction mixture for preparing this material, the molar ratio of silica to alumina was 9-36, and the molar ratio of water to alumina was 120-500.

In 1993, F. Delprato (Zeolites, 13 (1993) 122-127) also synthesized a high-silicon Y molecular sieve having a silica-to-alumina ratio of about 7 by using polyethylene oxide (PEO) as a template agent, wherein PEO having a molecular weight of 2000-8000 was advantageous for obtaining a well crystallized Y molecular sieve. The gel composition ratio of this system was 10$SiO_2$:1$Al_2O_3$:2.4$Na_2O$:xPEO:140$H_2O$ (the weight ratio of $SiO_2$/PEO=3), and the high-silicon Y molecular sieve may be obtained by hydrothermal crystallization at 100° C. for 8 days.

In 1998, B. De Witte synthesized a high-silicon Y molecular sieve having a silica-to-alumina ratio of 6.2-6.6 by using inositol as a template agent (Microporous and Mesoporous Materials, 23 (1998) 11-22). The gel composition ratio of this system was 10$SiO_2$:1$Al_2O_3$:2.7$Na_2O$:0.5 inositol: 140$H_2O$, and the high-silicon Y molecular sieve may be obtained by hydrothermal crystallization at 110° C. for 8 days.

CN1736867A disclosed the preparation of a mesoporous Y molecular sieve by using 1-cetyl-3-methyl imidazolium bromide or 1-cetyl-3-methyl pyridinium bromide, a long-chain alkyl ionic liquid, as a template agent. It focused on the effect of the Y molecular sieve having a mesoporous structure on the catalytic activity, and did not relate to the content whether the silica-to-alumina ratio thereof was increased or not, compared to that of a Y molecular sieve synthesized by a conventional method without template.

The template agents previously used for synthesizing high-silicon Y molecular sieve are mainly quaternary ammonium salts, cyclic- or chain-type alcohols, ethers, etc. No NaY molecular sieve having a silica-to-alumina ratio of 6 or more and a high crystallinity is synthesized by using a less volatile short-chain alkylimidazolium ionic liquid as a template agent or a structure directing agent under a hydrothermal condition.

SUMMARY OF THE INVENTION

In view of those described above, the silica-to-alumina ratio of Y molecular sieve has a crucial effect on its catalytic activity, and the inventors of the present disclosure experimentally find that by selecting an appropriate short-chain alkyl ionic liquid as a template agent, a NaY molecular sieve having a high crystallinity may be obtained and the backbone of the molecular sieve has a silica-to-alumina ratio of 6 or more. The present disclosure has been established based on these findings.

To this end, the present disclosure provides a method for preparing a NaY molecular sieve having a high silica-to-alumina ratio, wherein the method comprises the steps of:

a) mixing deionized water, a silicon source, an aluminum source, an alkali source, and ILs as a template agent to obtain an initial gel mixture;

b) maintaining the initial gel mixture obtained in step a) at a temperature of no more than 50° C., and stirring and aging for 1-100 hours to obtain a homogeneous gel mixture;

c) feeding the homogeneous gel mixture obtained in step b) into a high pressure synthesis kettle, closing the kettle, and increasing the temperature to 70-130° C., and allowing crystallization to be conducted under an autogenic pressure for 3-30 days; and d) after the crystallization is complete, separating the solid product, washing with deionized water to neutral and drying, to obtain the NaY molecular sieve having a high silica-to-alumina ratio, wherein the obtained NaY molecular sieve has a silica-to-alumina ratio of 6 or more, and the ILs is a short-chain alkylimidazolium ionic liquid, wherein the short-chain alkylimidazolium ionic liquid is any one or a mixture of two or more of 1-ethyl-3-methylimidazolium bromide, 1-allyl-3-methylimidazolium bromide, 1-butyl-3-methylimidazolium bromide, 1-ethyl-3-methylimidazolium chloride, 1-allyl-3-methylimidazolium chloride, and 1-butyl-3-methylimidazolium chloride.

In one preferred embodiment, the initial gel mixture obtained in the step a) has the following molar ratios:

$SiO_2/Al_2O_3$=6-20;
$Na_2O/Al_2O_3$=1-8;
$H_2O/Al_2O_3$=100-400; and
$ILs/Al_2O_3$=0.1-6, wherein the silicon source is based on $SiO_2$, the aluminum source is based on $Al_2O_3$, and the alkali source is based on $Na_2O$.

In one preferred embodiment, the silicon source used in the step a) is any one or a mixture of two or more of a silica sol, an activated silica, and an orthosilicate; the aluminum source is any one or a mixture of two or more of sodium aluminate, an activated alumina, and an aluminum alkoxide; and the alkali source is sodium hydroxide.

In one preferred embodiment, the aging temperature is 10-50° C. and the aging time is 8-72 hours in the step b).

In one preferred embodiment, the temperature for crystallization is 80-110° C. and the crystallization time is 8-24 days in the step c).

In one preferred embodiment, the crystallization process in the step c) is performed in a static or dynamic state.

The present disclosure also provides a molecular sieve having a high silica-to-alumina ratio prepared by the method described above, wherein the NaY molecular sieve has a silica-to-alumina ratio of 6 or more.

The advantageous effects of the present disclosure include, but are not limited to, obtaining a NaY molecular sieve having a silica-to-alumina ratio of 6 or more by using a specific short-chain alkylimidazolium ionic liquid as a template agent.

DESCRIPTION OF EMBODIMENTS

Figure 1:
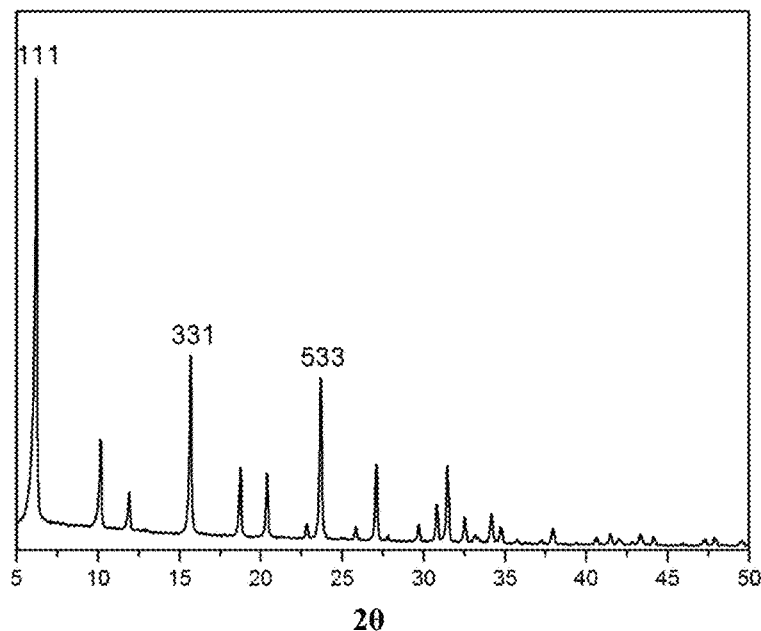
FIG. 1 is an XRD pattern of the product synthesized according to Example 1 of the present disclosure.

In the present invention, a phase-pure NaY molecular sieve having a high silica-to-alumina ratio is synthesized under a hydrothermal condition by using a short-chain alkylimidazolium ionic liquid as a template agent or a structure directing agent and mixing an appropriate silicon source, an appropriate aluminum source, and an appropriate alkali source in deionized water.

In one preferred embodiment, the method for preparing a NaY molecular sieve having a high silica-to-alumina ratio (the silica-to-alumina ratio is 6 or more) of the present disclosure comprises the following steps:

a) mixing deionized water, a silicon source, an aluminum source, an alkali source, and a template agent at a certain ratio to obtain an initial gel mixture. Preferably, the initial gel mixture has the following molar ratios:

$SiO_2/Al_2O_3$=6-20;
$Na_2O/Al_2O_3$=1-8;
$H_2O/Al_2O_3$=100-400; and
$ILs/Al_2O_3$=0.1-6, wherein ILs is a short-chain alkylimidazolium ionic liquid, the silicon source is based on $SiO_2$, the aluminum source is based on $Al_2O_3$, and the alkali source is based on $Na_2O$;

b) maintaining the initial gel mixture obtained in step a) under a condition of no more than 50° C., and stirring and aging for 1-100 hours to obtain a homogeneous gel mixture;

c) feeding the homogeneous gel mixture obtained in step b) into a high pressure synthesis kettle, closing the kettle, increasing the temperature to 70-130° C., and allowing crystallization to be conducted under an autogenic pressure for 3-30 days; and d) after the crystallization is complete, separating the solid product, washing with deionized water to neutral and drying, to obtain the high-silicon NaY molecular sieve.

The short-chain alkylimidazolium ionic liquid used in the step a) is any one of or a mixture of two or more of 1-ethyl-3-methylimidazolium bromide ([Emim]Br), 1-allyl-3-methylimidazolium bromide ([Amim]Br), 1-butyl-3-methylimidazolium bromide ([Bmim]Br), 1-ethyl-3-methylimidazolium chloride ([Emim]Cl), 1-allyl-3-methylimidazolium chloride ([Amim]Cl), and 1-butyl-3-methylimidazolium chloride ([Bmim]Cl).

Preferably, the silicon source used in the step a) is any one of or a mixture of two or more of a silica sol, an activated silica, and an orthosilicate; the aluminum source is any one of or a mixture of two or more of sodium aluminate, an activated alumina, or an aluminum alkoxide; and the alkali source is sodium hydroxide.

Preferably, in the initial gel mixture of the step a), $SiO_2/Al_2O_3$=10-18.

Preferably, in the initial gel mixture of the step a), $Na_2O/Al_2O_3=2-6$.

Preferably, in the initial gel mixture of the step a), $H_2O/Al_2O_3=180-300$.

Preferably, in the initial gel mixture of the step a), $ILs/Al_2O_3=0.5-5$.

Preferably, the aging temperature is 10-50° C. and the aging time is 8-72 hours in the step b).

Preferably, the crystallization temperature is 80-110° C. and the crystallization time is 8-24 days in the step c).

Preferably, the crystallization process in the step c) is performed in a static or dynamic state.

In the present disclosure, the X-ray powder diffraction phase analysis (XRD) of the product is carried out on X'Pert PRO X-ray diffractometer of PANalytical Corporation, Netherlands, using a Cu target, Kα radiation source (λ=0.15418 nm), a voltage of 40 KV, and a current of 40 mA. The relative crystallinity of the product is calculated based on the sum of XRD peak intensities of crystal planes 111, 331, 533. By comparing to the crystallinity of the sample in Example 1, which is 100%, the relative crystallinities of other samples are obtained.

In the present disclosure, SU8020 scanning electron microscope of Hitach is used in SEM morphologic analysis of the product.

In the present disclosure, the silica-to-alumina ratio of the product is measured by using Magix 2424 X-ray fluorescence analyzer (XRF) of Philips Corporation.

In the present disclosure, Infinity plus 400WB solid nuclear magnetic resonance spectrum analyzer of Varian Corporation, U.S., is used in silicon nuclear magnetic resonance ($^{29}$Si MAS NMR) analysis of the product, with a BBO MAS probe and an operational magnetic field strength of 9.4 T. The silica-to-alumina ratio of the product may also be calculated from the result of $^{29}$Si MAS NMR, and the equation is as follows:

$$\text{NMR SiO}_2/\text{Al}_2\text{O}_3 = 8*(S_{Q0}+S_{Q1}+S_{Q2}+S_{Q3}+S_{Q4})/(S_{Q1}+2S_{Q2}+3S_{Q3}+4S_{Q4})$$

wherein Qi represents the difference in the number of aluminum atoms surrounding a silicon-oxygen tetrahedron ($SiO_4$) (i=0, 1, 2, 3, 4), and $S_{Qi}$ represents a corresponding peak area of Qi on the silicon nuclear magnetic resonance spectrum.

The present disclosure will be described in detail below by Examples, but the present disclosure is not limited to these Examples.

Example 1

Types and molar amounts for respective raw materials, crystallization temperatures and crystallization times, crystal forms, relative crystallinities, and silica-to-alumina ratios ($SiO_2/Al_2O_3$) determined by XRF and NMR were shown in the following Table 1.

In Example 1, the formulating process was as follows: 1.94 g of 1-ethyl-3-methylimidazolium bromide ([Emim]Br) and 1.19 g of sodium hydroxide were dissolved in 23 g of deionized water, to which 2 g of sodium aluminate (the content percentage by mass of $Al_2O_3$ was 52%) was then added, and they were stirred until a clarified liquid is obtained; then 24.48 g of silica sol (the content percentage by mass of $SiO_2$ was 30.45%) was further added to obtain an initial gel mixture. This initial gel mixture was stirred at room temperature for 24 hours to produce a homogeneous gel mixture; and this homogeneous gel mixture was transferred to a stainless high pressure synthesis kettle. At this time, molar ratio of respective components in the synthesis system is $1.0[Emim]Br:12SiO_2:1Al_2O_3:3.2Na_2O:220H_2O$.

Figure 2:
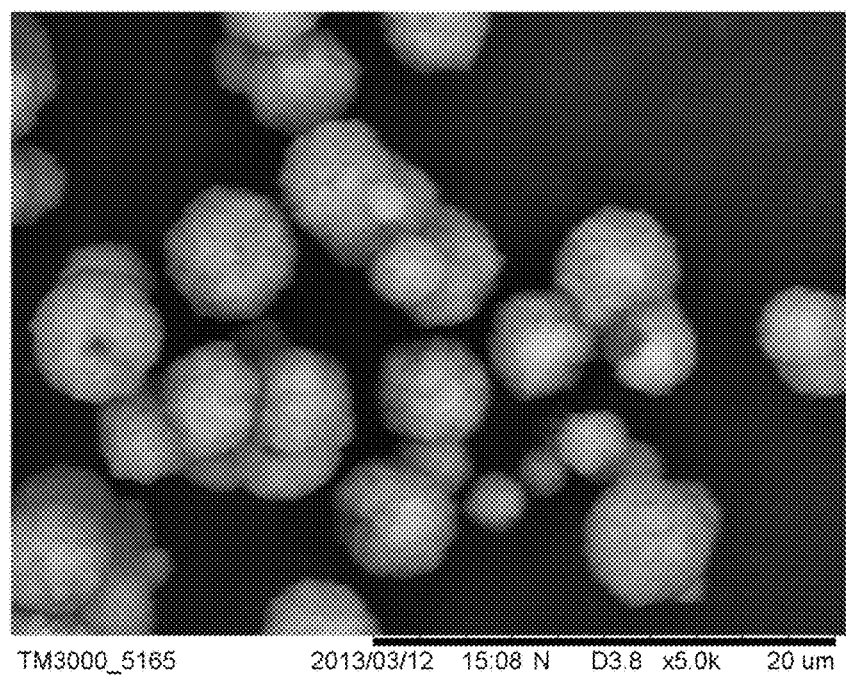
FIG. 2 is a scanning electron microscope (SEM) image of the product synthesized according to Example 1 of the present disclosure.
Figure 3:
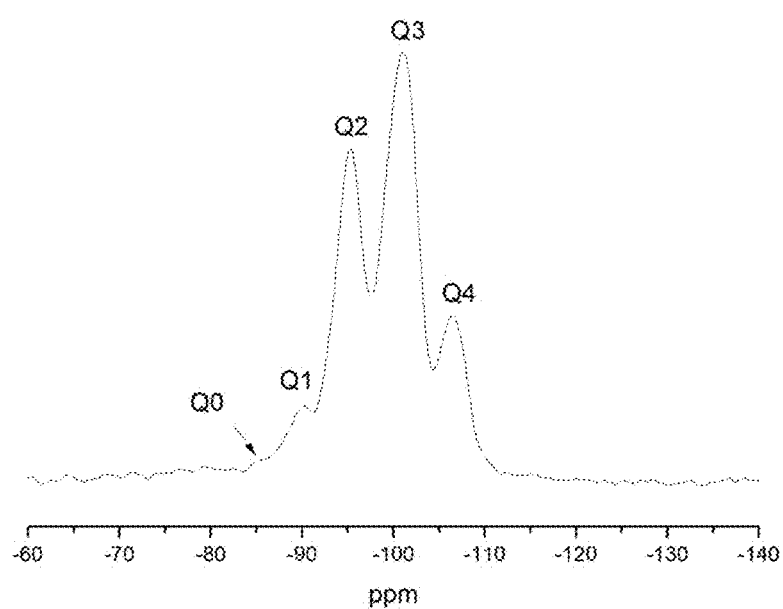
FIG. 3 is a silicon nuclear magnetic resonance ($^{29}$Si-NMR) spectrum of the product synthesized according to Example 1 of the present disclosure.

The high pressure synthesis kettle was closed and placed in an oven of which the temperature had been increased to a constant temperature of 110° C., and static crystallization was performed at an autogenic pressure for 14 days. After the crystallization was complete, the solid product was separated by centrifugation, washed with deionized water to neutral, and then dried in air at 100° C. to obtain a raw powder. The sample of this raw powder was taken for XRD analysis, and the result thereof was shown in FIG. 1 and Table 2; the scanning electron microscope (SEM) image of this sample was shown in FIG. 2; and the silicon nuclear magnetic resonance ($^{29}$Si MAS NMR) spectrum of this sample was shown in FIG. 3. At the meanwhile, the silica-to-alumina ratio of the product was calculated by XRF and silicon nuclear magnetic resonance spectrum, respectively. By summarizing the results of the analyses described above, it was indicated and determined that the synthesized product was a NaY molecular sieve having a silica-to-alumina ratio of greater than 6.

Examples 2-24

Types and amounts of the materials used, and reaction conditions as well as analytical results were shown in the following Table 1, and the processes for synthesis and analysis were the same as those of Example 1.

The synthesized samples were subjected to XRD analysis, and data results thereof were similar to those in Table 2. That is, the positions and shapes of peaks were the same, and relative peak intensities fluctuated in a range of ±20% according to the change of the synthesis conditions. It was demonstrated that the synthetic product had the characteristics of a NaY molecular sieve structure. Other analytical results of these samples were shown in the following Table 1.

Comparative Example

Types and amounts of the materials used, and reaction conditions as well as analytical results were shown in the following Table 1, and the processes for synthesis and analysis were the same as those of Example 1, except for using 0.1 mol of triethylamine as a template agent. The obtained sample was subjected to XRD analysis, and the data thereof demonstrated that the synthesized product had the structural characteristics of a NaY molecular sieve. Other analytical results of this sample were shown in the following Table 1.

TABLE 1

| Example | Type and amount of template agent | Aluminum source and moles of $Al_2O_3$ contained | Silicon source and moles of $SiO_2$ contained | Alkali source and moles of $Na_2O$ contained | $H_2O$ | Crystallization temperature (° C.) | Crystallization time (day) | Crystal form | Relative crystallinity (%) | XRF ($SiO_2/Al_2O_3$) | NMR ($SiO_2/Al_2O_3$) |
|---|---|---|---|---|---|---|---|---|---|---|---|
| 1 | [Emim]Br 0.1 mol | Sodium aluminate 0.10 mol | Silica sol 1.2 mol | 0.32 mol | 22 mol | 110 | 14 | NaY | 100 | 7.2 | 6.8 |

TABLE 1-continued

| Example | Type and amount of template agent | Aluminum source and moles of Al$_2$O$_3$ contained | Silicon source and moles of SiO$_2$ contained | Alkali source and moles of Na$_2$O contained | H$_2$O | Crystallization temperature(° C.) | Crystallization time (day) | Crystal form | Relative crystallinity (%) | XRF (SiO$_2$/Al$_2$O$_3$) | NMR (SiO$_2$/Al$_2$O$_3$) |
|---|---|---|---|---|---|---|---|---|---|---|---|
| 2 | [Bmim]Br 0.1 mol | Sodium aluminate 0.10 mol | Silica sol 1.2 mol | 0.32 mol | 22 mol | 110 | 14 | NaY | 100 | 7.1 | 6.8 |
| 3 | [Amim]Br 0.1 mol | Sodium aluminate 0.10 mol | Silica sol 1.2 mol | 0.32 mol | 22 mol | 110 | 14 | NaY | 100 | 6.9 | 6.7 |
| 4 | [Emim]Cl 0.1 mol | Sodium aluminate 0.10 mol | Silica sol 1.2 mol | 0.32 mol | 22 mol | 110 | 14 | NaY | 100 | 7.2 | 6.8 |
| 5 | [Bmim]Cl 0.1 mol | Sodium aluminate 0.10 mol | Silica sol 1.2 mol | 0.32 mol | 22 mol | 110 | 14 | NaY | 100 | 7.1 | 6.8 |
| 6 | [Amim]Cl 0.1 mol | Sodium aluminate 0.10 mol | Silica sol 1.2 mol | 0.32 mol | 22 mol | 110 | 14 | NaY | 100 | 6.9 | 6.7 |
| 7 | [Emim]Br 0.1 mol | Sodium aluminate 0.10 mol | Silica sol 0.6 mol | 0.32 mol | 22 mol | 110 | 14 | NaY | 100 | 6.2 | 6.1 |
| 8 | [Bmim]Br 0.1 mol | Sodium aluminate 0.10 mol | Silica sol 0.6 mol | 0.32 mol | 22 mol | 110 | 14 | NaY | 100 | 6.1 | 6.0 |
| 9 | [Amim]Br 0.1 mol | Sodium aluminate 0.10 mol | Silica sol 0.6 mol | 0.32 mol | 22 mol | 110 | 14 | NaY | 100 | 6.3 | 6.2 |
| 10 | [Emim]Br 0.1 mol | Sodium aluminate 0.10 mol | Silica sol 2.0 mol | 0.50 mol | 22 mol | 110 | 14 | NaY | 100 | 7.2 | 6.8 |
| 11 | [Bmim]Br 0.1 mol | Sodium aluminate 0.10 mol | Silica sol 2.0 mol | 0.50 mol | 22 mol | 110 | 14 | NaY | 100 | 7.3 | 6.9 |
| 12 | [Amim]Br 0.1 mol | Sodium aluminate 0.10 mol | Silica sol 2.0 mol | 0.50 mol | 22 mol | 110 | 14 | NaY | 100 | 7.1 | 6.7 |
| 13 | [Emim]Br 0.1 mol | Sodium aluminate 0.10 mol | Activated silica 1.2 mol | 0.32 mol | 22 mol | 110 | 14 | NaY | 95 | 7.1 | 6.7 |
| 14 | [Bmim]Br 0.1 mol | Sodium aluminate 0.10 mol | Activated silica 1.2 mol | 0.32 mol | 22 mol | 110 | 14 | NaY | 95 | 7.0 | 6.6 |
| 15 | [Amim]Br 0.1 mol | Sodium aluminate 0.10 mol | Activated silica 1.2 mol | 0.32 mol | 22 mol | 110 | 14 | NaY | 90 | 6.9 | 6.7 |
| 16 | [Emim]Br 0.1 mol | Activated alumina 0.10 mol | Silica sol 1.2 mol | 0.32 mol | 22 mol | 110 | 14 | NaY | 100 | 6.4 | 6.2 |
| 17 | [Bmim]Br 0.1 mol | Activated alumina 0.10 mol | Silica sol 1.2 mol | 0.32 mol | 22 mol | 110 | 14 | NaY | 95 | 6.6 | 6.4 |
| 18 | [Amim]Br 0.1 mol | Activated alumina 0.10 mol | Silica sol 1.2 mol | 0.32 mol | 22 mol | 110 | 14 | NaY | 90 | 6.5 | 6.2 |
| 19 | [Emim]Br 0.1 mol | Sodium aluminate 0.10 mol | Silica sol 1.2 mol | 0.32 mol | 22 mol | 70 | 30 | NaY | 80 | 6.2 | 6.0 |
| 20 | [Bmim]Br 0.1 mol | Sodium aluminate 0.10 mol | Silica sol 1.2 mol | 0.32 mol | 22 mol | 70 | 30 | NaY | 85 | 6.1 | 6.0 |
| 21 | [Amim]Br 0.1 mol | Sodium aluminate 0.10 mol | Silica sol 1.2 mol | 0.32 mol | 22 mol | 70 | 30 | NaY | 80 | 6.2 | 6.1 |
| 22 | [Emim]Br 0.1 mol | Sodium aluminate 0.10 mol | Silica sol 1.2 mol | 0.32 mol | 22 mol | 130 | 3 | NaY | 95 | 7.5 | 7.2 |
| 23 | [Bmim]Br 0.1 mol | Sodium aluminate 0.10 mol | Silica sol 1.2 mol | 0.32 mol | 22 mol | 130 | 3 | NaY | 95 | 7.4 | 7.1 |
| 24 | [Amim]Br 0.1 mol | Sodium aluminate 0.10 mol | Silica sol 1.2 mol | 0.32 mol | 22 mol | 130 | 3 | NaY | 95 | 7.6 | 7.3 |
| Comparative Example | Triethylamine 0.1 mol | Sodium aluminate 0.10 mol | Silica sol 1.2 mol | 0.32 mol | 22 mol | 100 | 7 | NaY | 70 | 5.4 | 5.1 |

TABLE 2

XRD result of the sample of Example 1

| No. | 2θ | d(Å) | 100 × I/I$^0$ |
|---|---|---|---|
| 1 | 6.2041 | 14.24645 | 100 |
| 2 | 10.1409 | 8.72289 | 20.15 |
| 3 | 11.8975 | 7.4387 | 8.47 |
| 4 | 15.6692 | 5.6556 | 40.16 |
| 5 | 18.7069 | 4.74353 | 15.78 |
| 6 | 20.3883 | 4.35596 | 14.41 |
| 7 | 22.8253 | 3.8961 | 3.26 |
| 8 | 23.6769 | 3.75787 | 36.24 |
| 9 | 25.0092 | 3.56062 | 0.44 |
| 10 | 25.8118 | 3.4517 | 2.89 |
| 11 | 27.0779 | 3.29311 | 17.44 |
| 12 | 27.7943 | 3.20983 | 1.11 |
| 13 | 29.6723 | 3.01082 | 3.78 |
| 14 | 30.7843 | 2.90455 | 8.7 |
| 15 | 31.4336 | 2.84602 | 17.04 |
| 16 | 32.4937 | 2.75555 | 5.67 |
| 17 | 33.1205 | 2.70482 | 1.83 |
| 18 | 34.1286 | 2.6272 | 6.5 |
| 19 | 34.7195 | 2.58383 | 3.64 |
| 20 | 35.7076 | 2.51456 | 0.89 |
| 21 | 37.2197 | 2.4158 | 0.79 |
| 22 | 37.9445 | 2.37131 | 3.64 |
| 23 | 39.3958 | 2.28723 | 0.34 |
| 24 | 40.6107 | 2.22157 | 1.61 |
| 25 | 41.4555 | 2.17823 | 2.56 |
| 26 | 41.9693 | 2.15275 | 1.41 |
| 27 | 42.8121 | 2.1123 | 0.67 |
| 28 | 43.2876 | 2.0902 | 2.43 |
| 29 | 44.1074 | 2.05323 | 1.93 |
| 30 | 45.8438 | 1.97942 | 0.44 |
| 31 | 47.2353 | 1.92431 | 1.46 |
| 32 | 47.8334 | 1.90163 | 1.63 |
| 33 | 49.4874 | 1.84188 | 1 |

It can be seen from the results of above Table 1 and Table 2 that with respect to the NaY molecular sieve synthesized by the method of the present disclosure, the silica-to-alumina ratio of each of molecular sieve samples in Examples 1-24, either a silica-to-alumina ratio of the product determined by XRF method or a silica-to-alumina ratio of the backbone of the product determined by silicon nuclear magnetic resonance spectrum data, is remarkably higher than the silica-to-alumina ratio of the molecular sieve sample obtained in Comparative Example. On the one hand, it is indicated that in the case of using a conventional amine as a template agent, the silica-to-alumina ratio of the resultant sample is relatively low and is difficult to reach 6, and the crystallinity is relatively low; and on the other hand, it is indicated that in the case of using a short-chain alkylimidazolium ionic liquid as a template agent, the silica-to-alumina ratio of the resultant product is 6 or more, or even higher, and the crystallinity is high. The use of this NaY molecular sieve having a high crystallinity and a high silica-to-alumina ratio can significantly improve the catalytic cracking in terms of activity, stability, and the like.

The present invention has been described in detail above, but the present invention is not limited to specific embodiments described herein. It is to be understood by the person skilled in the art that other modifications and variations can be made without departing from the scope of the invention. The scope of the invention is defined by the appended claims.

The invention claimed is:

1. A method for preparing a NaY molecular sieve having a high silica-to-alumina ratio, wherein the method comprises the steps of:
   a) mixing deionized water, a silicon source, an aluminum source, an alkali source, and ILs as a template agent to obtain an initial gel mixture;
   b) maintaining the initial gel mixture obtained in step a) at a temperature of no more than 50° C., and stirring and aging for 1-100 hours to obtain a homogeneous gel mixture;
   c) feeding the homogeneous gel mixture obtained in step b) into a high pressure synthesis kettle, closing the kettle, increasing the temperature to 70-130° C., and allowing crystallization to be conducted under an autogenic pressure for 3-30 days; and
   d) after the crystallization is complete, separating the solid product, washing with deionized water to neutral and drying, to obtain the NaY molecular sieve having a high silica-to-alumina ratio,
   wherein the obtained NaY molecular sieve has a silica-to-alumina ratio of 6 or more, and the ILs is a short-chain alkylimidazolium ionic liquid, wherein the short-chain alkylimidazolium ionic liquid is any one of or a mixture of two or more of 1-ethyl-3-methylimidazolium bromide, 1-allyl-3-methylimidazolium bromide, 1-butyl-3-methylimidazolium bromide, 1-ethyl-3-methylimidazolium chloride, 1-allyl-3-methylimidazolium chloride, and 1-butyl-3-methylimidazolium chloride.

2. The method according to claim 1, wherein the initial gel mixture obtained in the step a) has the following molar ratios:
   $SiO_2/Al_2O_3$=6-20;
   $Na_2O/Al_2O_3$=1-8;
   $H_2O/Al_2O_3$=100-400; and
   $ILs/Al_2O_3$=0.1-6,
   wherein the silicon source is based on $SiO_2$, the aluminum source is based on $Al_2O_3$, and the alkali source is based on $Na_2O$.

3. The method according to claim 1, wherein the silicon source used in the step a) is any one of or a mixture of two or more of a silica sol, an activated silica, and an orthosilicate; the aluminum source is any one or a mixture of two or more of sodium aluminate, an activated alumina, and an aluminum alkoxide; and the alkali source is sodium hydroxide.

4. The method according to claim 1, wherein the aging temperature is 10-50° C. and the aging time is 8-72 hours in the step b).

5. The method according to claim 1, wherein the temperature for crystallization is 80-110° C. and the crystallization time is 8-24 days in the step c).

6. The method according to claim 1, wherein the crystallization process in the step c) is performed in a static or dynamic state.

7. A molecular sieve having a high silica-to-alumina ratio comprising an ILs which is a short-chain alkylimidazolium ionic liquid, wherein the short-chain alkylimidazolium ionic liquid is any one of or a mixture of two or more of 1-ethyl-3-methylimidazolium bromide, 1-allyl-3-methylimidazolium bromide, 1-butyl-3-methylimidazolium bromide, 1-ethyl-3-methylimidazolium chloride, 1-allyl-3-methylimidazolium chloride, and 1-butyl-3-methylimidazolium chloride and; prepared by the method according to claim 1, wherein the NaY molecular sieve has a silica-to-alumina ratio of 6 or more.

* * * * *